United States Patent
Tobiason et al.

(10) Patent No.: US 8,492,703 B2
(45) Date of Patent: Jul. 23, 2013

(54) LENS ABERRATION CORRECTION IN A DOUBLY TELECENTRIC DISPLACEMENT SENSOR

(75) Inventors: Joseph D. Tobiason, Woodinville, WA (US); Toru Yaku, Kawasaki (JP); Emi Kaneko, Yokohama (JP); Eric H. Altendorf, Everett, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 887 days.

(21) Appl. No.: 12/535,561

(22) Filed: Aug. 4, 2009

(65) Prior Publication Data

US 2011/0031383 A1 Feb. 10, 2011

(51) Int. Cl.
*G01D 5/34* (2006.01)
(52) U.S. Cl.
USPC ............ 250/231.13; 250/231.14; 250/231.15; 250/231.16; 250/231.17; 341/11; 341/13; 356/616; 356/617
(58) Field of Classification Search
USPC .................... 250/231.13–231.18; 341/11, 13; 356/616–617
See application file for complete search history.

(56) References Cited

U.S. PATENT DOCUMENTS

| | | | |
|---|---|---|---|
| 3,904,295 A * | 9/1975 | Hock et al. ................ | 356/398 |
| 4,772,119 A * | 9/1988 | Bouwhuis et al. ............ | 356/124 |
| 6,608,722 B2 | 8/2003 | Cowan | |
| 6,628,390 B1 * | 9/2003 | Johnson ................ | 356/400 |
| 6,665,050 B2 * | 12/2003 | Shiraishi ................ | 355/53 |
| 6,798,574 B2 | 9/2004 | Kim | |
| 7,186,969 B2 | 3/2007 | Shimomura | |
| 7,279,674 B2 * | 10/2007 | Ng et al. ............ | 250/231.13 |
| 7,307,789 B2 | 12/2007 | Mizutani | |
| 7,329,859 B2 | 2/2008 | Mizutani | |
| 7,435,945 B2 | 10/2008 | Shimomura | |
| 2007/0018084 A1 * | 1/2007 | Shimomura et al. ...... | 250/231.13 |
| 2007/0051884 A1 * | 3/2007 | Romanov et al. ........ | 250/231.13 |
| 2008/0121788 A1 | 5/2008 | Kawada | |

* cited by examiner

*Primary Examiner* — Georgia Y Epps
*Assistant Examiner* — Kevin Wyatt
(74) *Attorney, Agent, or Firm* — Christensen O'Connor Johnson Kindness PLLC

(57) ABSTRACT

A method and apparatus for suppressing loss of scale image contrast due to interference effects from optical path length differences, including lens profile aberrations, are provided in a displacement sensing optical encoder that uses a telecentric imaging configuration. According to the invention, the encoder is configured such that the image light that reaches the detector comprises symmetric ray bundles concentrated symmetrically on opposite sides of the optical axis center at the limiting aperture of the telecentric imaging configuration. Central ray bundles, and/or other ray bundles that have an optical path lengths significantly different than the operational symmetric ray bundles are prevented or blocked. As a result destructive interference is prevented and image contrast is improved.

28 Claims, 8 Drawing Sheets

US 8,492,703 B2

LENS ABERRATION CORRECTION IN A DOUBLY TELECENTRIC DISPLACEMENT SENSOR

FIELD OF THE INVENTION

The invention relates generally to precision measurement instruments, and more particularly to a doubly telecentric displacement sensor configuration to detect the displacement of a periodic scale pattern.

BACKGROUND OF THE INVENTION

Various optical displacement sensors generally referred to as encoders utilize a periodic scale structure that allows the displacement of an encoder readhead relative to the scale to be determined by illuminating the scale with light and imaging a periodic pattern of light. U.S. Pat. Nos. 7,186,969; 7,307,789; and 7,435,945, each of which is hereby incorporated herein by reference, disclose various encoder configurations that utilize either singly or doubly telecentric imaging systems for imaging the periodic pattern of light and sensing displacement of the periodic scale structure. Telecentric imaging systems provide certain desirable features in such encoders. However, existing encoders that use telecentric imaging fail to provide combinations of economy, robustness, accuracy, and compact dimensions that are desirable for a number of applications. Therefore, improved configurations for encoders that use telecentric imaging are desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to doubly telecentric encoder configurations that provide improved combinations of economy, robustness, accuracy, and compact dimensions. In accordance with one aspect of the invention, the doubly telecentric configurations presented herein provide compensation for certain problematic lens aberration errors which would otherwise cause unwanted interference effects and diminish the signal to noise (S/N) ratio of the periodic scale image that is detected as the basis for sensing scale displacement.

Such problematic lens aberration errors may arise because the periodic scale image may comprise different orders of light diffracted from the periodic scale (e.g., a scale grating). The various diffracted orders of light may follow different paths through the telecentric lenses. Aberrations in the telecentric lenses, where the lenses deviate from a nominal lens thickness or profile, may thus result in varying path lengths or phases between the orders of light present in the scale image. Depending on the phase of each order of light as it forms the periodic scale image at the plane of the detector, the orders of light may destructively interfere at various regions of the photodetector that sense the periodic scale image, reducing its S/N ration (e.g., its visibility of contrast) and thereby reducing the potential resolution and/or accuracy of encoder.

According to one aspect of the invention, various encoder configurations disclosed herein are arranged such that the different orders of light that contribute to the periodic scale image are restricted to follow different but symmetric optical paths through the complementary lenses of a doubly telecentric imaging arrangement. The complementary lenses are configured such that the symmetric optical paths nominally include similar or identical optical aberrations or lens thickness deviations (in total, along the optical paths), and thus have similar optical path lengths, despite such optical aberrations or lens thickness deviations in the complementary lenses. Thus, the aforementioned destructive interference effects, which may otherwise arise due to lens imperfections and the like, are inherently significantly suppressed or eliminated in such configurations.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
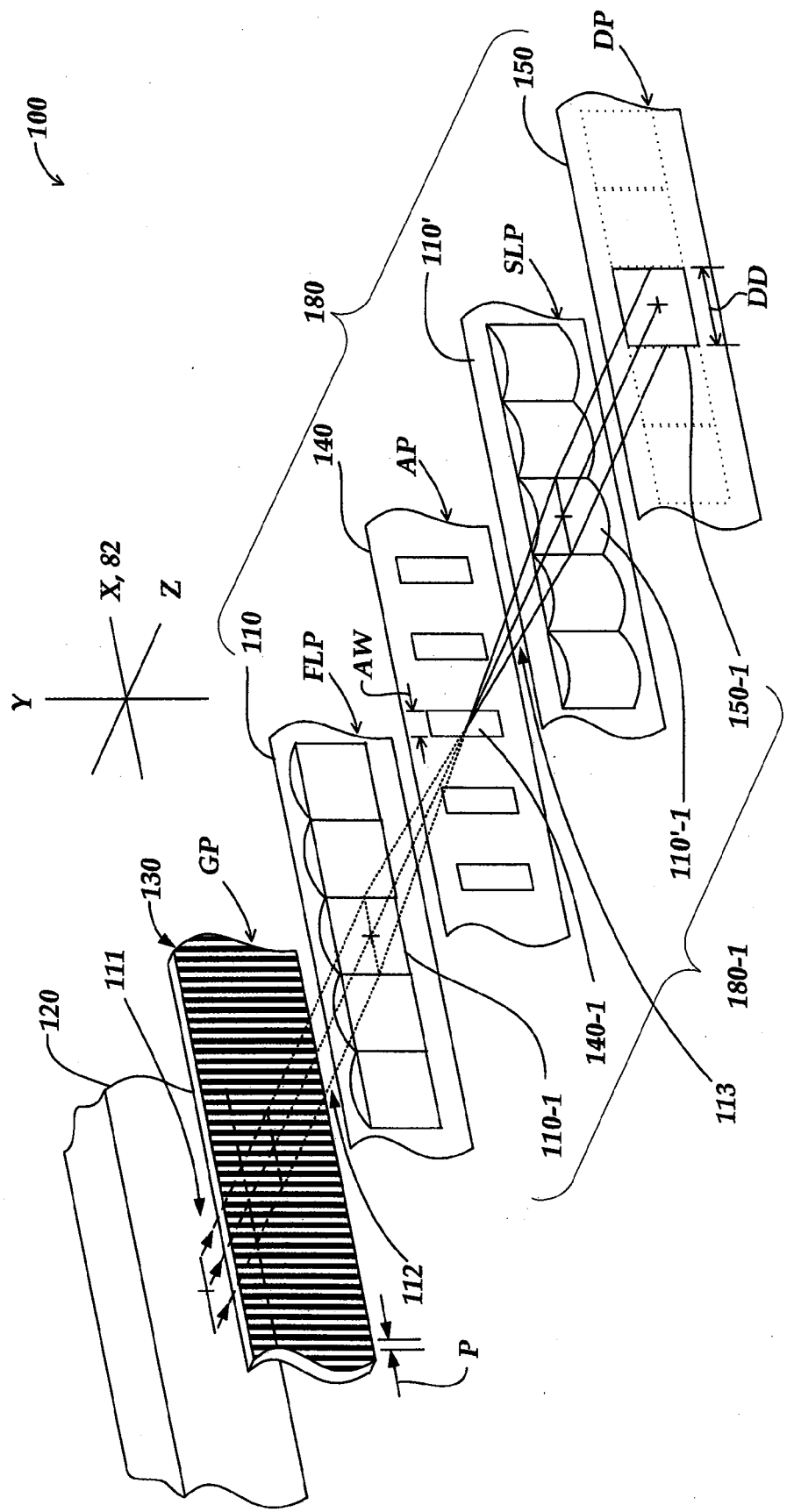
FIG. 1 is a partially-schematic isometric diagram of a generic doubly telecentric encoder arrangement.

FIG. 1 is a partially schematic isometric diagram of a generic doubly telecentric encoder arrangement 100, including an illumination source 120, a scale grating pattern 130 comprising a periodic pattern (having a spatial wavelength or pitch P) arranged along a measuring axis 82 at a grating plane GP, and a doubly telecentric imaging configuration 180. The doubly telecentric imaging configuration 180 comprises a first lens array 110 at a first lens plane FLP, an aperture array 140 at an aperture plane AP, a second lens array 110' at a second lens plane SLP and a photodetector configuration 150 at a detector plane DP.

FIG. 1 shows X, Y and Z directions, used throughout the figures herein. The X direction is parallel to a measuring axis 82 of the encoder arrangement 100, which is parallel to the plane of the scale grating pattern 130 and perpendicular to its grating bars. The Y direction is parallel to the plane of the scale grating pattern 130 perpendicular to the X direction, and the Z direction is orthogonal to the X and Y directions.

According to a convention used herein, individual elements of the various arrays are numbered with corresponding dashes (e.g., the lens 110-1 if the lens array 110), and sets of individual elements that cooperate to provide an individual image path or channel may be referred to as image channels or image channel configurations. For example, in FIG. 1, the doubly telecentric image channel configuration 180-1 comprises the first lens 110-1, the limiting aperture 140-1, the second lens 110'-1, and the photodetector portion 150-1. In general, the doubly telecentric imaging configuration 180 may comprise one or more similar image channel configurations, in various embodiments. In operation, as exemplified by the image channel configuration 180-1, the illumination source 120 illuminates the scale grating pattern 130 with coherent or partially coherent source light 111. The scale grating pattern 130 then diffracts the source light to provide diffracted scale light 112. It will be appreciated that the limiting aperture 140-1, which has an aperture width AW along the X direction, acts as a spatial filter to select or limit the light rays that pass through the image channel configuration 180-1. FIG. 1 illustrates three such light rays, two extreme rays and one central ray. As shown in FIG. 1, the lens 110-1 transmits such light rays towards the limiting aperture 140-1. The limiting aperture 140-1 transmits them as spatially filtered image light 113 to the second lens 110'-1, and the second lens 110'-1 transmits and focuses the spatially filtered image light to form an image of the scale grating pattern 130 at the photodetector portion 150-1. The photodetector portion 150-1 is configured to spatially filter the image of the scale grating pattern 130 (e.g., according to known methods) to provide a set of signals (e.g., quadrature signals) that are indicative of the displacement of the scale grating pattern 130 relative to the other elements of the encoder arrangement 100. In various embodiments, scale grating pattern 130 may provide a single scale track for an incremental-type encoder. In other embodiments, scale grating pattern 130 may be one of multiple scale tracks used to provide an absolute-type encoder, which may use various respective sensing principles and/or photodetector portions (not shown) for the various other scale tracks.

Figure 2:
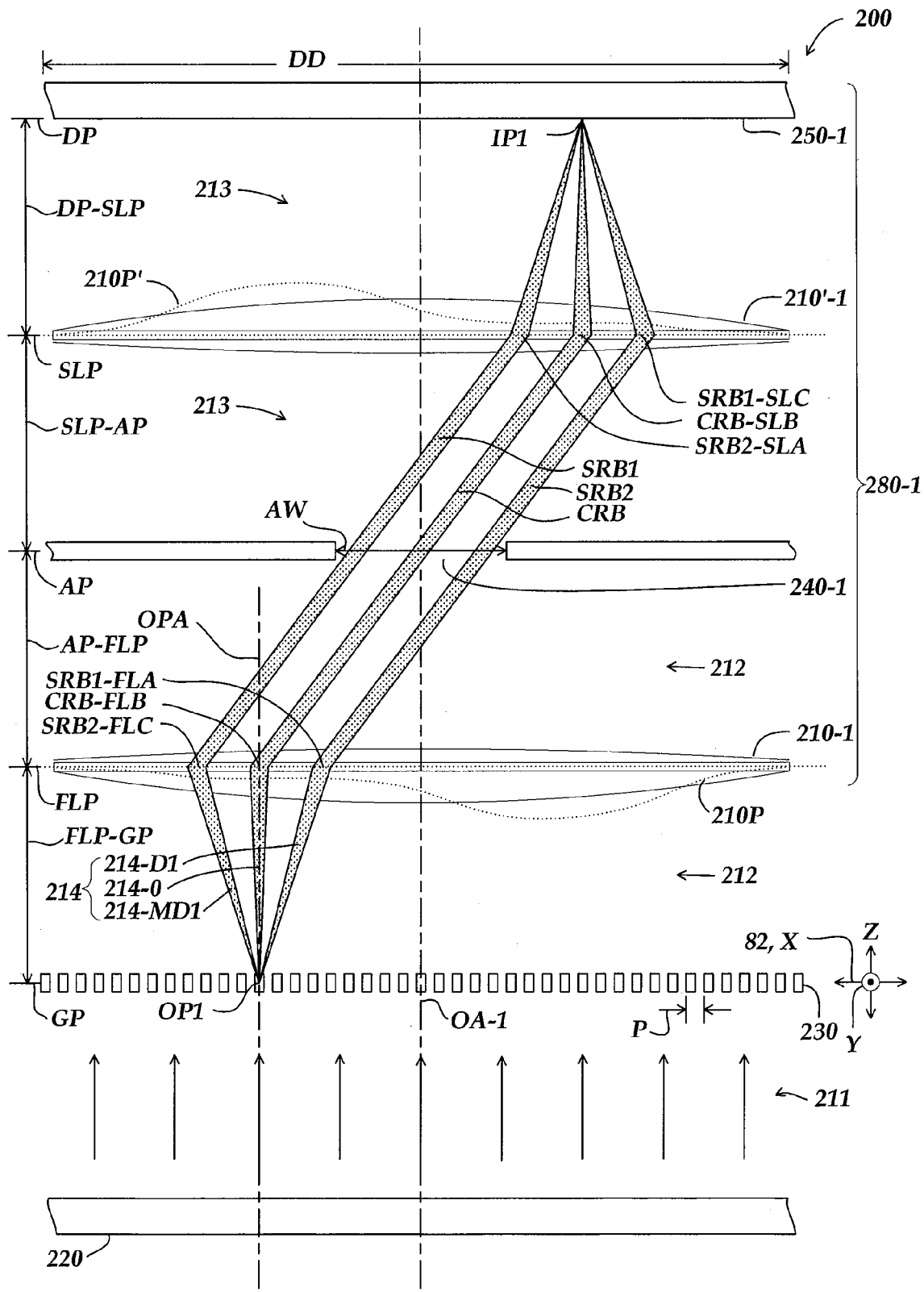
FIG. 2 is a schematic cross-section diagram showing differing optical paths through an uncompensated image channel which may be understood to be an uncompensated version of the generic doubly telecentric encoder arrangement shown in FIG. 1.

FIG. 2 is a schematic cross-section diagram showing differing optical paths through an uncompensated image channel 280-1 of an uncompensated doubly telecentric encoder arrangement 200, which may be understood to be an uncompensated version of the generic doubly telecentric encoder arrangement 100 shown in FIG. 1. Analogous elements have similar reference number suffixes in FIGS. 1 and 2 (e.g., the element 210-1 in FIG. 2 is analogous to the counterpart element 110-1 in FIG. 1). The elements of the encoder configuration 200 may generally be understood based on previous description of their analogous counterparts in the encoder configuration 100 of FIG. 1, unless otherwise indicated by description or context. Therefore, only certain aspects of the uncompensated doubly telecentric encoder arrangement 200 are described in detail below.

U.S. Pat. No. 7,307,789, (hereinafter "the '789 patent") which is hereby incorporated herein by reference, discloses various embodiments of doubly telecentric encoder configurations which utilize a second lens (or lens array) that is similar in form to a first lens (or lens array), and which is inverted relative to the first lens along an optical axis, such that lens aberrations of the two similar lenses approximately compensate one another to reduce aberrations in the resulting image. It should be appreciated that the teachings of the '789 patent address only compensating lens aberrations that cause spatial distortions in an image of a scale pattern, that is, distortion of the location of pattern features in the image). The embodiment shown in FIG. 2 may provide a similar type of correction of spatial distortions in an image when the first lens 210-1 and second lens 210-1' have similar aberrations. However, a more subtle problem may occur, related to interference effects that may appear in the image due to lens aberrations. The '789 patent does not address this problem. The following discussion of FIG. 2 concerns this problem.

Describing the elements of FIG. 2, the uncompensated image channel 280-1 has an optical axis OA-1 and comprises the first lens 210-1 at the first lens plane FLP, the limiting aperture 240-1 at the aperture plane AP, the second lens 210'-1 at the second lens plane SLP and the photodetector portion 150-1 at the detector plane DP. The first lens plane FLP is located at a distance FLP-GP from the scale grating plane GP; the aperture plane AP is located at a distance AP-FLP from the first lens plane FLP; the second lens plane SLP is located at a distance SLP-AP from the aperture plane AP, and the detector plane DP is located at a distance DP-SLP from the second lens plane SLP. In various embodiments, the first lens 210-1 and the second lens 210'-1 may each have the same focal length F1 and each of the distances FLP-GP, AP-FLP, SLP-AP and DP-SLP may equal the focal length F1. However, in other embodiments, provided that certain "compensated configuration" design principles described further below are maintained according to this invention, the distances may have other values, depending on a desired level of magnification for the scale pattern image on the photodetector portion 150-1 or other design considerations.

Briefly, in operation, the illumination source 220 illuminates the scale grating pattern 230 with source light 211. The scale grating pattern 230 then diffracts the source light to provide diffracted scale light 212. The limiting aperture 240-1 acts as a spatial filter to select or limit the light rays that pass through the image channel configuration 280-1, according to known telecentric imaging principles. For example, the lights rays that pass through the image channel configuration 280-1 may be limited to rays that enter the first lens 210-1 within a relatively narrow angular range that is nominally approximately parallel to optical axis OA-1. For a given spacing of components along optical axis OA-1, the angular range may be controlled by the dimension AW of the limiting aperture 240-1. Rays within the angular range are approximately collimated relative to one another and directed by the lens 210-1 toward the limiting aperture 240-1. The limiting aperture 240-1 transmits the rays as spatially filtered image light 213 to the second lens 210'-1, and the second lens 210'-1 transmits and focuses the spatially filtered image light to form an image of the scale grating pattern 230 at the photodetector portion 250-1. The photodetector portion 250-1 is configured to spatially filter the image of the scale grating pattern 230 to provide a set of signals (e.g., quadrature signals) that are indicative of the displacement of the scale grating pattern 230 relative to the other elements of the encoder arrangement 200.

In contrast to the three light rays shown in FIG. 1, each of which contributes to a different portion of the image of the scale grating pattern 130 at the photodetector portion 150-1, FIG. 2 shows three representative ray bundles 214 (also referred to as rays 214 in some contexts) that originate from the same object point OP1 at the scale grating pattern 230 and contribute to the same image point IP1 at the photodetector portion 250-1. In particular, the ray bundles 214 fall within the angular range admitted by the limiting aperture 240-1 and include a minus 1st order diffracted ray bundle 214-MD1, a zero order ray bundle 214-0, and a plus 1st order ray diffracted bundle 214-D1. In FIG. 2, the zero order ray bundle 214-0 is also referred to as a central ray bundle CRB. According to a convention used herein, the "central" ray bundle may mean the ray bundle that coincides with the optical axis OA-1 at the aperture plane AP. In general, these ray bundles correspond to diffraction orders that may be understood (according to known optical concepts) to arise from optical diffraction of the source light 211 at the scale grating pattern 230. In FIG. 2, the source light 211 enters scale grating pattern 230 approximately parallel to the optical axis OA-1 (e.g., along an object point axis OPA proximate to the object point OP1). The widths or divergence of the ray bundles 214-MD1, 214-0 and 214-D1 generally depend on the level of spatial coherence or collimation of the illumination source 220. A higher level of spatial coherence or collimation will generally result in a smaller width or divergence for each ray bundle.

Ideally, the ray bundles 214-MD1, 214-0 and 214-D1 should recombine at the image point IP1 to faithfully reproduce the intensity at object point OP1, and contribute to a high contrast image of the scale grating pattern 230 at the photodetector portion 250-1. However, in practice, the ray bundles 214-MD1, 214-0 and 214-D1 may have slightly different individual optical path lengths between the image point IP1 and the object point OP1 (e.g., due to lens aberrations) and, thus, different phases at object point OP1. Therefore, due to phase differences, they may destructively interfere with one another, diminishing their combined intensity at the object point OP1, which may reduce or destroy contrast in a corresponding portion of the image of the scale grating pattern 230 at the photodetector portion 250-1, as described in greater detail below.

Examining the ray bundles 214-D1, 214-0 and 214-MD1 in greater detail, they may have intensities $I_{+1}$, $I_0$ and $L_1$, respectively. Regarding optical path lengths, the doubly telecentric image channel 280-1 has a symmetric configuration, and the ray bundles 214-D1 and 214-MD1 are configured with rotational symmetry about the intersection of the optical axis OA-1 and the aperture plane AP. Such ray bundles may also be referred to as symmetric ray bundles SRB1 and SRB2, respectively. The optical path of the ray bundle SRB1 passes through areas SRB1-FLA of the first lens 210-1 and SRB1-SLC of the second lens 210-1'. Relative to the ideal phase change that one would expect an ideal lens to produce in these areas, we may define phase change error components due to lens aberrations, phase changes $\Delta\phi_{FLA}$ and $\Delta\phi_{SLC}$, respectively. The optical path of the ray bundle SRB2 passes through areas SRB2-FLC of the first lens 210-1 and SRB2-SLA of the second lens 210-1', which introduce analogous phase change error components, phase changes $\Delta\phi_{FLC}$ and $\Delta\phi_{SLA}$, respectively. FIG. 2 schematically illustrates respective lens aberration profiles 210P and 210P' for first and second lenses 210-1 and 210-1' (greatly exaggerated for clarity), indicated by curved dotted lines overlying the first lens 210-1 and second lens 210-1'. The adjacent flat dotted line may be understood to represent the ideal phase change of the lens at a particular location, and the distance between the curved dotted line and the flat dotted line at a particular location may be understood to represent the amount of lens aberration (e.g., due to form or material deviations) and/or the associated phase change error component at that location.

The symmetric ray bundles SRB1 and SRB2 and the central ray bundle CRB have peak intensities $I_{SRB1}$, $I_{SRB2}$ and $I_{CRB}$. At the photodetector detector portion 250-1, for purposes of this discussion, the complex amplitudes $A_{SRB1}$ and $A_{SRB2}$ of the symmetric ray bundles SRB1 and SRB2 may be represented as:

$$A_{SRB1} = \sqrt{I_{SRB1}} e^{i(\Delta\phi_{Ideal} + \Delta\phi_{FLA} + \Delta\phi_{SLC})} \quad (1)$$

$$A_{SRB2} = \sqrt{I_{SRB2}} e^{i(\Delta\phi_{Ideal} + \Delta\phi_{FLC} + \Delta\phi_{SLA})} \quad (1)$$

The lenses 210-1 and 210'-1 may be nominally identically fabricated lenses that are assembled such that they are inverted and rotated about the optical axis 180 degrees relative to one another. Therefore, their aberration profiles 210P and 210P' are nominally minor images of one another, such that:

$$\Delta\phi_{FLA} \approx \Delta\phi_{SLA} \quad (3)$$

$$\Delta\phi_{FLC} \approx \Delta\phi_{SLC} \quad (4)$$

Thus, the symmetric ray bundles SRB1 and SRB2 (214-MD1 and 214-D1) have the same optical phase ($\Delta\phi_{Ideal} + \Delta\phi_{FLA} + \Delta\phi_{FLC}$) and their complex amplitudes $A_{SRB1}$ and $A_{SRB2}$ therefore constructively interfere, which is desired. However, such is not the case for the central ray bundle CRB (214-0). The central ray bundle CRB includes areas CRB-FLB of the lens 210-1 and CRB-SLB of the lens 210-1', which may introduce phase change error components analogous to those outlined above, the phase changes $\Delta\phi_{FLB}$ and $\Delta\phi_{FLB}$, respectively.

At the photodetector detector portion 250-1, the complex amplitude $A_{CRB}$ of the central ray bundle CRB may be represented as:

$$A_{CRB} = \sqrt{I_{CRB}} e^{i(\Delta\phi_{Ideal} + \Delta\phi_{FLB} + \Delta\phi_{SLB})} \quad (5)$$

Since lens aberration profiles 210P and 210P' are minor images of one another:

$$\Delta\phi_{FLB} + \Delta\phi_{SLB} \quad (6)$$

Therefore:

$$A_{CRB} = \sqrt{I_{CRB}} e^{i(\Delta\phi_{Ideal} + \Delta\phi_{FLB})} \quad (7)$$

The total combined intensity $I_{IP}$ of the symmetric ray bundles SRB1 and SRB2 and the central ray bundle CRB detected at an image point IP on the photodetector detector portion 250-1 is given by:

$$I = |A_{SRB1} + A_{SRB2} + A_{CRB}|^2 \quad (8)$$

It should be appreciated that while the complex amplitudes $A_{SRB1}$ and $A_{SRB2}$ of the symmetric ray bundles SRB1 and SRB2 have the same phase (e.g., characterized by ($\Delta\phi_{Ideal} + \Delta\phi_{FLA} + \Delta\phi_{FLC}$) according to EQUATIONS 1-4), the complex amplitude $A_{CRB}$ of the central ray bundle has a different phase (e.g., characterized by ($\Delta\phi_{Ideal} + 2\Delta\phi_{FLB}$) according to EQUATIONS 5-7). Such a phase mismatch is undesirable since it may allow destructive interference effects which may reduce or destroy contrast in a corresponding portion of the image of the scale grating pattern 230 at the photodetector portion 250-1, as described in greater detail with reference to FIG. 3.

Figure 3:
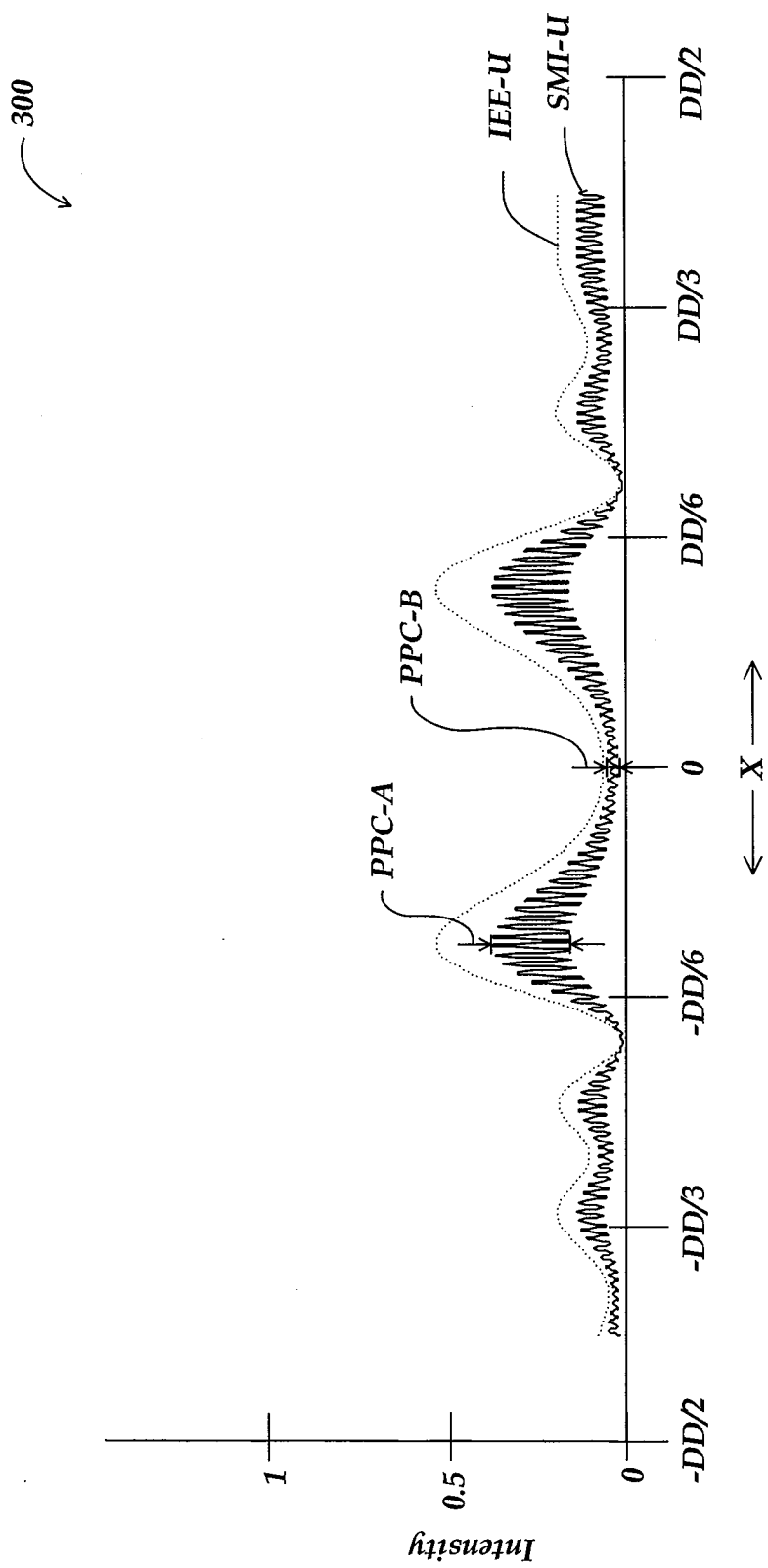
FIG. 3 is a graph showing an undesirable non uniform spatially modulated image intensity in a scale grating pattern image generated by the uncompensated doubly telecentric encoder of FIG. 2.

FIG. 3 is a graph 300 showing an undesirable non-uniform spatially modulated image intensity in a scale grating pattern image generated by the uncompensated doubly telecentric encoder configuration of FIG. 2 at the detector portion 250-1. Along the horizontal axis, the graph 300 shows positions along the X direction at the photodetector portion 250-1, within the dimension DD. The spatially modulated image intensity SMI-U for the uncompensated encoder configuration (e.g., the image intensity at each position according to EQUATION 8) is shown along the vertical axis at each position. The periodic structure of the spatially modulated image intensity SMI-U generally images the periodic structure of the scale grating pattern 230. However, for the uncompensated image channel 280-1, as shown in FIG. 3, the spatially modulated image intensity SMI-U is further limited by the previously indicated interference effects, which are represented in FIG. 3 as a function of the position X by the interference effects envelope IEE-U. For example, the relatively high image contrast indicated by the high peak-to-peak contrast PPC-A, located at approximately X=(−DD/9), corresponds to a local region where the relative phase of the symmetric ray bundles SRB1 and SRB2 is approximately the same as the relative phase of the central ray bundle CRB (e.g., approximately n*360 of phase difference, where n is an integer). For image points in the region surrounding this X location, all of their contributing ray bundles (e.g., the symmetric ray bundles SRB1 and SRB2 and the central ray bundle CRB) constructively interfere, and may approximately reproduce the light intensity of the corresponding object point with high image fidelity. In comparison, the negligible image contrast indicated by the near-zero peak-to-peak contrast PPC-B, located at approximately X=0, corresponds to a local region where the relative phase of the symmetric ray bundles SRB1 and SRB2 is approximately 180 degrees out of phase with the central ray bundle CRB. For image points in the region surrounding the X=0 location, the symmetric ray bundles SRB1 and SRB2 destructively interfere with the central ray bundle CRB, leading to approximately zero intensity regardless of the light intensity of the corresponding object point. The graph 300 indicates other locations of destructive interference and negligible image contrast at approximately X=(+/−DD/5), and so on. Low contrast in the image of the scale grating pattern 230 on the photodetector portion 250-1 leads to a low signal to noise ratio in its resulting displacement signals, which prevents determining the displacement of the scale grating pattern 230 with the desired degree of accuracy.

It should be appreciated that when the illumination source 220 is coherent and/or well-collimated, the loss of contrast due to destructive interference may be more severe. It may still be advantageous, however, to use source light that is at least partially coherent due to the availability of economical and compact sources (e.g., LED's or laser diodes) and/or to use well collimated light in order to produce to provide a clear image and avoid wasting energy in poorly collimated rays that are filtered out by a doubly telecentric imaging arrangement.

Figure 4:
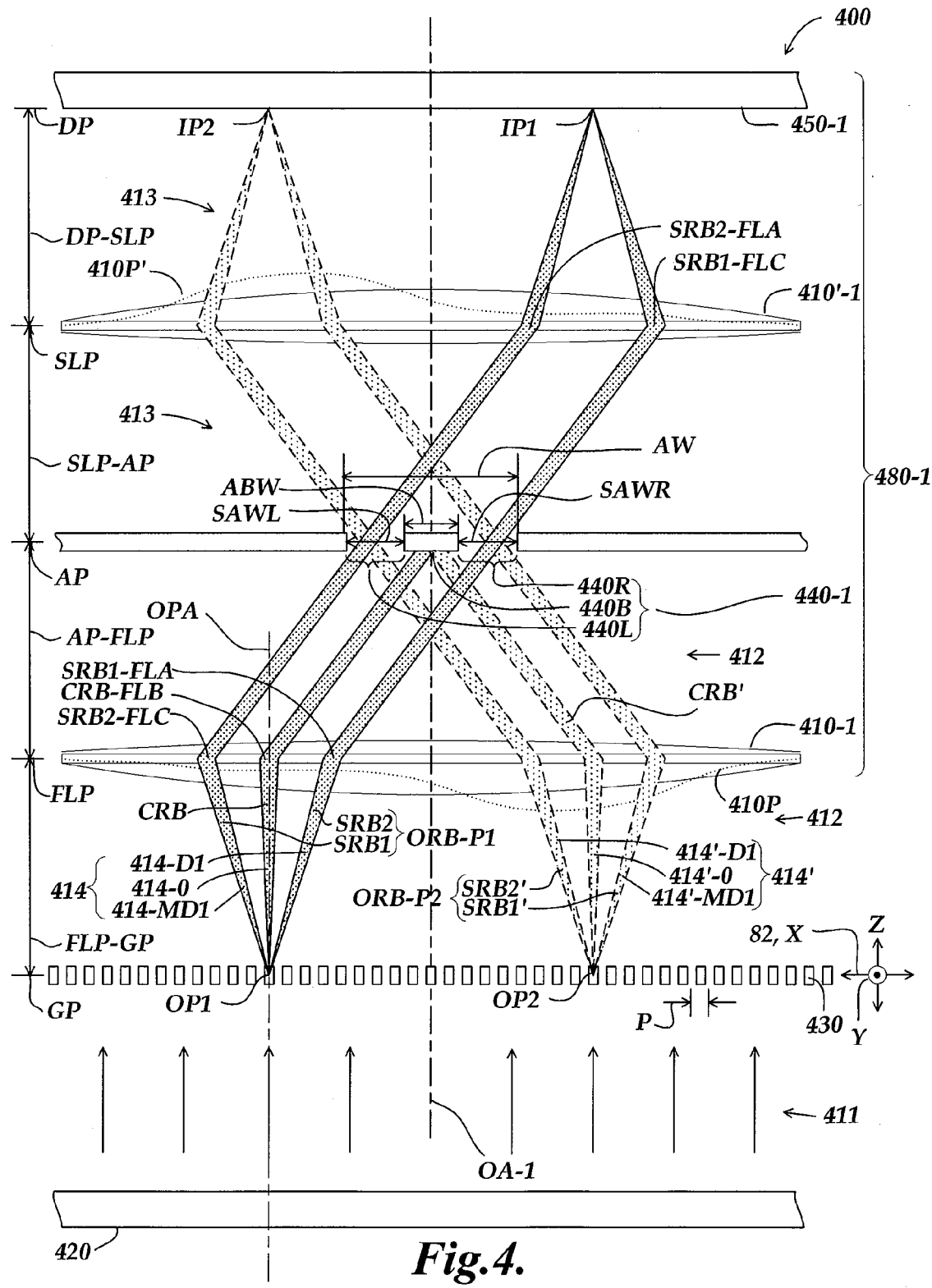
FIG. 4 is a schematic cross-section diagram of a first embodiment of a compensated doubly telecentric encoder configuration in accordance with the present invention.

FIGS. 4 through 8 illustrate various aspects of compensated doubly telecentric encoder configurations that avoid the undesirable destructive interference effects outlined above. FIGS. 4, 5, 7 and 8 are schematic cross-section diagrams of embodiments of compensated doubly telecentric encoder configurations, which may be understood to be compensated versions of the generic doubly telecentric encoder arrangement 100 shown in FIG. 1, and to include compensated image channels which are analogous to the uncompensated image channel 280-1 of FIG. 2, but which are further configured to reduce or eliminate the previously outlined destructive interference effects. Analogous elements have similar reference number suffixes in FIGS. 1, 2, 4, 5, 7 and 8 (e.g., the element 410-1 in FIG. 4 is analogous to the counterpart elements 110-1 and/or 210-1 in FIGS. 1 and 2, respectively, and so on). The elements of the encoder configurations of FIGS. 4, 5, 7 and 8 may therefore generally be understood based on previous description of their analogous counterparts in FIGS. 1 and 2, unless otherwise indicated by description or context. Therefore, only certain aspects of the compensated doubly telecentric encoder arrangements of FIGS. 4, 5, 7 and 8 are described in detail below.

FIG. 4 is a schematic cross-section diagram of a first embodiment of a compensated doubly telecentric encoder configuration 400, which includes a compensated image channel 480-1 configured to reduce or eliminate the previously outlined destructive interference effects. In particular, in one embodiment, the encoder configuration 400 may be configured and operate similarly to the encoder configuration 200 of FIG. 2, except that, unlike the uncompensated image channel 280-1, the compensated image channel 480-1 includes an aperture blocking element 440B approximately centered in the limiting aperture 440-1, to block the central ray bundle CRB (414-0). It will be appreciated that this leaves only the symmetric ray bundles SRB1 and SRB2 (414-D1 and 414-MD1) to contribute to the image intensity at the image point IP1. Thus, in the embodiment shown in FIG. 3, the symmetric ray bundles SRB1 and SRB2 are also collectively referred to as the operational ray bundles ORB-P1, which image the object point OP1 at the corresponding image point IP1. In this embodiment, the compensated image channel 480-1 is configured such that the symmetric ray bundles SRB1 and SRB2 have approximately equal optical path lengths and the same relative phase, according to previously described design principles. Thus, the symmetric ray bundles SRB1 and SRB2 have the same optical phase and the same complex amplitudes $A_{SRB1}$ and $A_{SRB2}$ at the image point IP1, constructively interfere to produce a light intensity corresponding to (e.g., proportional to) the light intensity at the object point OP1, and, therefore, provide significant image contrast in the image of the scale grating pattern 430 at the photodetector portion 450-1. The potential destructive interference effects of the central ray bundle CRB/414-0 (e.g., similar to those previously described for the central ray bundle CRB/214-0) are reduced or eliminated because the central ray bundle CRB/414-0 is approximately or completely blocked by the aperture blocking element 440B. That is, for this embodiment, the total combined intensity $I_{IP}$ detected at an image point IP on the photodetector detector portion 450-1 is given by:

$$I = |A_{SRB1} + A_{SRB2}|^2 \qquad (9)$$

where ASRB1 and ASRB2 may be interpreted according to EQUATIONS 1-4. The corresponding image contrast is described in greater detail below, with reference to FIG. 6.

In one embodiment of the compensated image channel 480-1, wherein the first and second lenses 410-1 and 410-1' are formed by the same fabrication, process (e.g., as lenses in identical molded lens arrays), and starting with reference to a same orientation for the first and second lenses 410-1 and 410-1' in the fabrication process, the second lens 410-1' is rotated nominally 180 degrees about its optical axis and inverted relative to the first lens 410-1 along its optical axis before assembly, in the compensated image channel 480-1.

Regarding the limiting aperture 440-1, in the embodiment shown in FIG. 4, the aperture blocking element 440B would appear as a strip of material of width ABW bridging the aperture 440-1 along the Y direction, leaving open sub-apertures 440L and 440R having respective widths SAWL and SAWR along the X direction within the limiting aperture 440-1. In general, to provide a strong signal to noise ratio, it is advantageous if the limiting aperture width AW is determined such that it transmits at least a majority of the symmetric ray bundles SRB1 and SRB2. As may be seen by inspection of FIG. 4, for source light 411 having a nominal wavelength λ and scale grating pattern 430 having a scale grating pitch P, the nominal separation of the symmetric ray bundles SRB1 and SRB2 at the aperture plan AP depends on the diffraction angles of the symmetric ray bundles SRB1 and SRB2 and the distance "FLP-GP" between the grating plane and the first lens plane FLP. The diffraction angles are plus and minus arcsin [λ/P]. In some embodiments the limiting aperture width AW may be determined such that:

$$AW \geq KMIN * \text{``FLP-GP''} * \tan(\arcsin [\lambda/P]) \qquad (10)$$

where KMIN is at least 2. In some embodiments, it may be advantageous if KMIN is at least 2.5, or at least 3, to transmit a desirable amount of the symmetric ray bundles SRB1 and SRB2 (e.g., in order to provide a desirable amount of image contrast). In addition, in some embodiments, the limiting aperture width AW may be determined such that:

$$AW \leq KMAX*\text{"FLP-GP"}*\tan(\arcsin[\lambda/P]) \quad (11)$$

where KMAX is at most 5. In some embodiments, it may be advantageous if KMAX is at most 4, or at most 3, or as otherwise chosen to provide a desirable amount of spatial filtering of rays that produce spatial harmonics of the scale pitch P in the resulting image. When spatial harmonics are suppressed, the image intensity along the measuring axis direction in the image is a more ideally sinusoidal, which generally reduces displacement measurement errors and/or simplifies signal processing in an encoder system.

The aperture blocking element width ABW of the aperture blocking element 440B should also be chosen to transmit at least a majority of the symmetric ray bundles SRB1 and SRB2 (e.g., in order to provide a desirable amount of image contrast). In some embodiments, the aperture blocking element width ABW may be determined such that:

$$ABW \leq BMAX*\text{"FLP-GP"}*\tan(\arcsin[\lambda/P]) \quad (12)$$

where BMAX is at most 2. In some embodiments, it may be advantageous if BMAX is at most 1.5, or at most 1, to transmit a desirable amount of the symmetric ray bundles SRB1 and SRB2. In addition, to block most or all of the central ray bundle CRB, the aperture blocking element width ABW may be determined such that:

$$ABW \geq BMIN*\text{"FLP-GP"}*\tan(\arcsin[\lambda/P]) \quad (13)$$

where, in some embodiments, BMIN is at least 0.5. In some embodiments, it may be advantageous if BMIN is at least 0.75, or at least 1, to block a desirable amount of the central ray bundle CRB Summarizing the principles outlined above, it is advantageous if the respective sub aperture widths SAWL and SAWR transmit a significant portion of the symmetric ray bundles SRB1 and SRB2, while the aperture blocking element width ABW blocks most or all of the central ray bundle CRB, according to previously outlined principles. As previously outlined, the widths or divergence of the individual ray bundles SRB1, SRB2 and CRB generally depend on the level of spatial coherence and/or collimation of the illumination source 420. A higher level of coherence and/or collimation will generally result in a smaller width or divergence for each concentrated ray bundle. Tradeoffs may be made between the various factors outlined above (e.g., the dimensions AW, ABW, and the factors that govern separation and size of the various ray bundles), based on analysis or experiment, in order to provide a desirable signal to noise ratio.

The ray bundles 414' shown in FIG. 4 are analogous to the ray bundles 414, and are illustrated simply to reinforce the understanding that the features of the compensated image channel 480-1 are effective for suppressing central ray bundles that would otherwise be responsible for the previously described destructive interference, for any image point within its range (e.g., the image point IP2).

Figure 5:
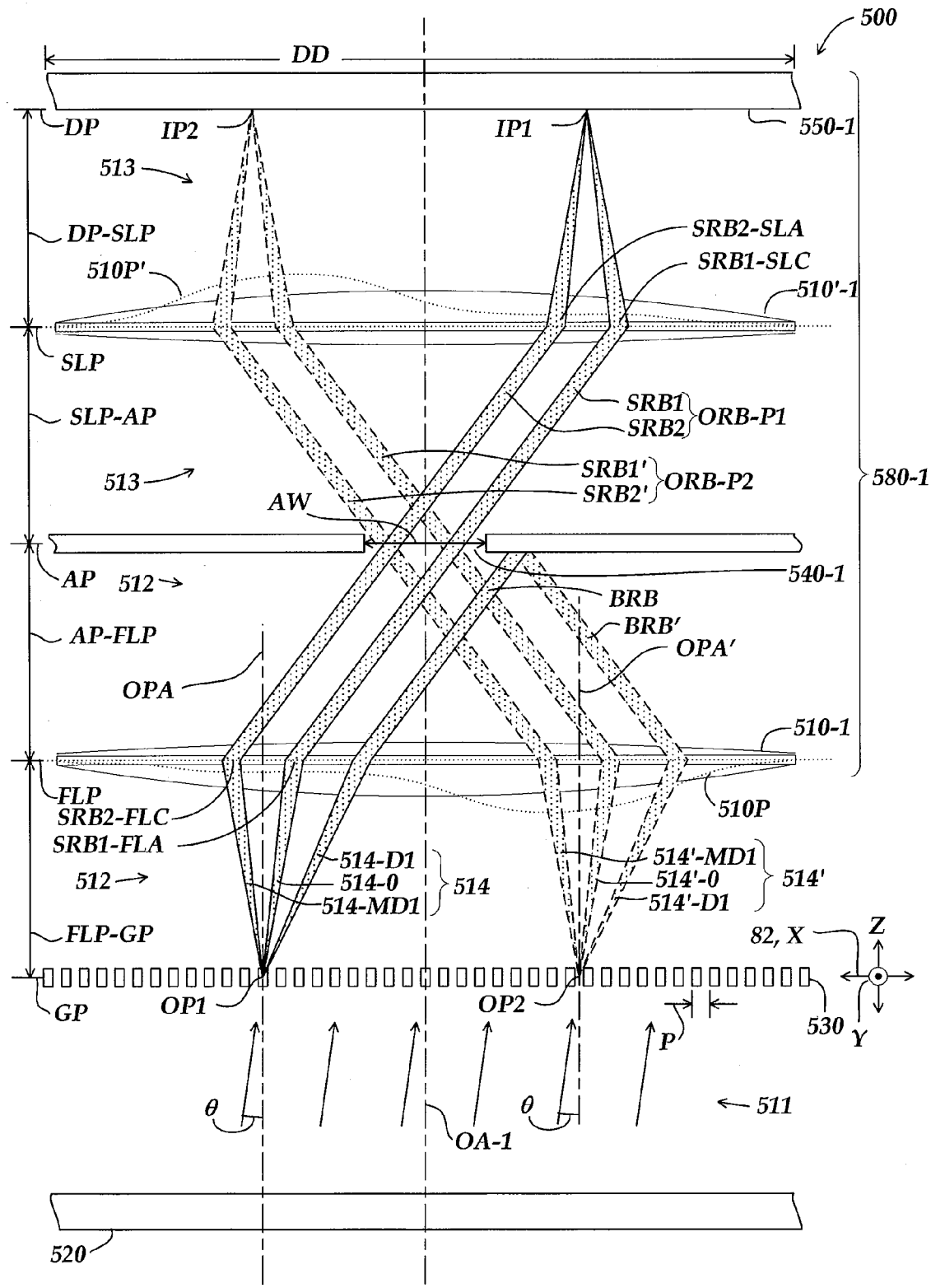
FIG. 5 is a schematic cross-section diagram of a second embodiment of a compensated doubly telecentric encoder configuration in accordance with the present invention.

FIG. 5 is a schematic cross-section diagram of a second embodiment of a compensated doubly telecentric encoder configuration 500, which is configured to reduce or eliminate the previously outlined destructive interference effects. In particular, in one embodiment, the encoder configuration 500 may be configured and operate similarly to the encoder configuration 200 of FIG. 2, except that it is configured such that the source light 511 is approximately collimated and directed to the scale grating pattern 530 along a direction parallel to a plane having a nominal illumination angle θ relative to a plane that is normal to the measuring axis direction 82 and parallel to the optical axis OA-1, as shown in FIG. 5. In particular, for source light 511 having a nominal wavelength λ and scale grating pattern 530 having a scale grating pitch P, the nominal illumination angle θ may be selected such that:

$$\theta = \sin^{-1}[\lambda/2P] \quad (14)$$

For the embodiment shown in FIG. 5, this causes the zero order ray bundle 514-0 to be directed at the nominal illumination angle θ and the minus first order diffracted ray bundle 514-MD1 to be directed at the angle -θ. Thus, these two ray bundles form symmetric ray bundles SRB1 and SRB2, which provide the image-forming characteristics similar to those previously described for symmetric ray bundles SRB1 and SRB2. As shown in FIG. 5, the first order diffracted ray bundle 514-D1 is directed approximately along an angle of 3θ, where it falls outside the limiting aperture 540-1 as a blocked ray bundle BRB. It will be appreciated that this leaves only the symmetric ray bundles SRB1 and SRB2 (514-0 and 514-MD1) to contribute to the image intensity at the image point IP1. Thus, in the embodiment shown in FIG. 5, the symmetric ray bundles SRB1 and SRB2 are also collectively referred to as the operational ray bundles ORB-P1, which image the object point OP1 at the corresponding image point IP1. In this embodiment, the image channel 580-1 is configured such that the symmetric ray bundles SRB1 and SRB2 have approximately equal optical path lengths and the same relative phase, according to previously described design principles. Thus, the symmetric ray bundles SRB1 and SRB2 have the same optical phase and the same complex amplitudes $A_{SRB1}$ and $A_{SRB2}$ at the image point IP1 and, therefore, constructively interfere to provide significant image contrast in the image of the scale grating pattern 530 at the photodetector portion 550-1. The potential destructive interference effects of the blocked ray bundle BRB/514-0 (which would potentially have a different optical path length and relative phase due to lens aberrations than would the symmetric ray bundles SRB1 and SRB2, analogous to the previously described the central ray bundle CRB/214-0) are reduced or eliminated because the blocked ray bundle BRB/514-0 is approximately or completely blocked at the limiting aperture 540-1. Thus, for this embodiment, the total combined intensity $I_{IP}$ detected at an image point IP on the photodetector detector portion 550-1 is also given by EQUATION 9.

Regarding the limiting aperture 540-1, it is advantageous if the limiting aperture width AW is determined such that it transmits at least a majority of the symmetric ray bundles SRB1 and SRB2. As may be seen by inspection of FIG. 5, the nominal separation of the symmetric ray bundles SRB1 and SRB2 at the aperture plan AP may depend on the illumination angle θ and the distance "FLP-GP" between the grating plane and the first lens plane FLP. Thus, in some embodiments the limiting aperture width AW may be determined such that:

$$AW > (JMIN*\text{"FLP-GP"}*\tan \theta) \quad (15)$$

where JMIN is at least 2. In some embodiments, it may be advantageous if JMIN is at least 2.5, to transmit a desirable amount of the symmetric ray bundles SRB1 and SRB2 (e.g., in order to provide a desirable amount of image contrast). Of course, it is advantageous if the aperture width AW not only transmits as much as possible of the symmetric ray bundles SRB1 and SRB2 but also blocks at least a majority of the blocked ray bundle BRB. In one embodiment corresponding to the outline above, and for a limiting aperture that is centered on the optical axis OA-1, blocking at least a majority of the blocked ray bundle BRB may approximately correspond to the condition:

$$AW < (JMAX \cdot \text{"FLP-GP"} \cdot \tan 3\theta) \quad (16)$$

where JMAX is at most 2. In some embodiments, it may be advantageous if JMAX is at most 1.5, or 1.3, to block a desirable amount of the blocked ray bundle BRB (e.g., in order to suppress destructive interference effects in the image).

In some embodiments, it may be advantageous if the limiting aperture 540-1 is arranged off center relative to the optical axis OA-1 (e.g., such that the ray bundle BRB is entirely blocked while the symmetric ray bundle SRB2 is entirely transmitted).

As previously outlined, the widths or divergence of the individual ray bundles SRB1, SRB2 and CRB generally depend on the level of spatial coherence and/or collimation of the illumination source 520. Tradeoffs may be made between the various factors outlined above (e.g., the dimensions AW, and the factors that govern separation and size of the various ray bundles), based on analysis or experiment, in order to provide a desirable signal to noise ratio. In some embodiments, the illumination source 320 may comprise a diode laser with a wavelength in the range of 500-700 nm Scale grating pattern 330 may have a pitch P of 20 μm. First lens 510 and second lens 510-1 may have a focal length 5000 μm="FLP-GP"="AP-FLP"="SLP-AP"="DP-SLP". For a wavelength λ that is equal to 500 nm, aperture width AW may be between approximately 125 μm and 375 μm, and more desirable between approximately 150 μm and 300 μm. For a wavelength λ that is equal to 600 nm, aperture width AW may be between approximately 150 μm and 450 μm, and more desirable between approximately 175 μm and 350 μm.

The ray bundles 514' shown in FIG. 5 are analogous to the ray bundles 514, and are illustrated simply to reinforce the understanding that the features of the compensated encoder configuration 500 are effective for blocking ray bundles (e.g., ray bundle BRB') that would otherwise be responsible for the previously described destructive interference, for any image point within its range (e.g., the image point IP2).

Figure 6:
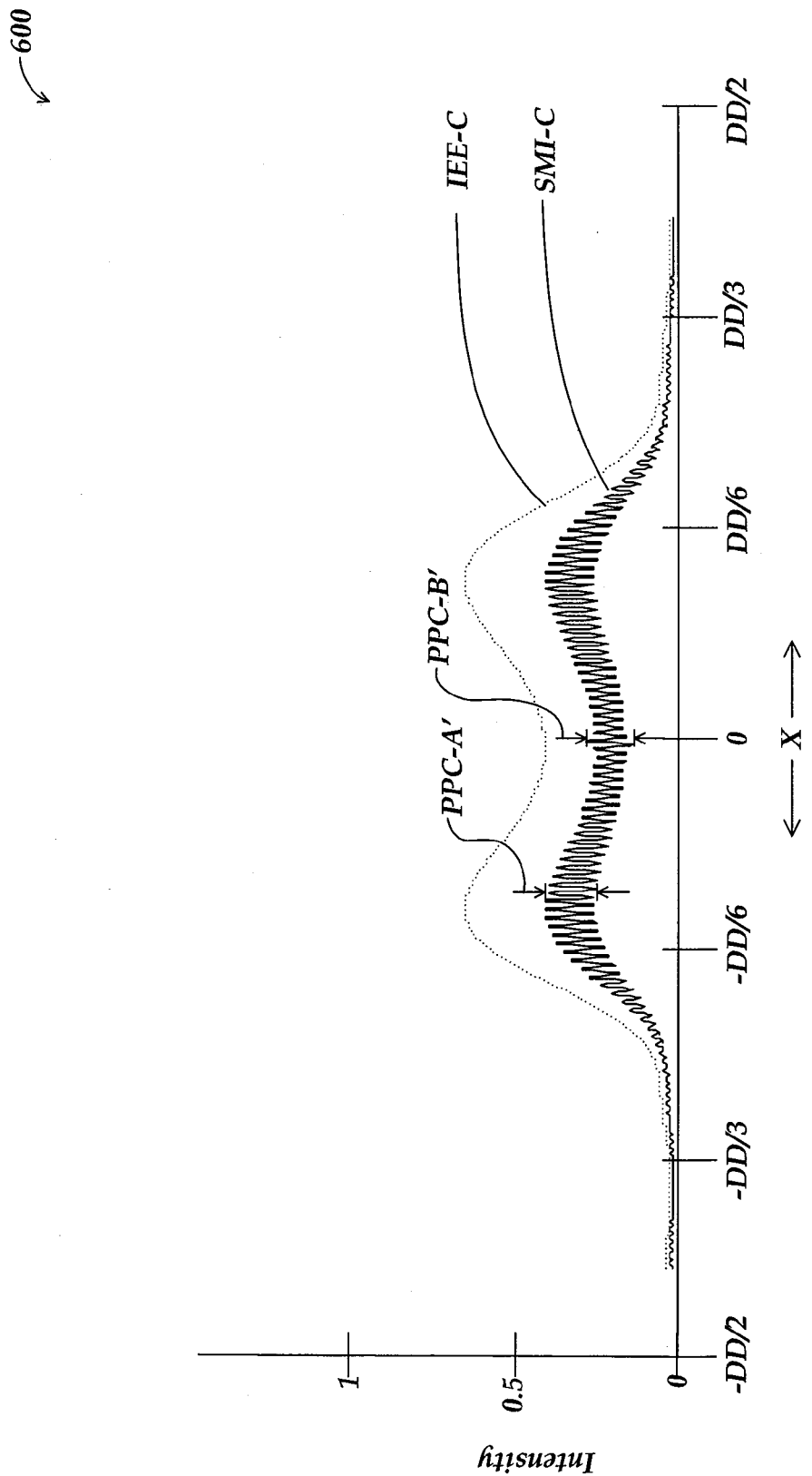
FIG. 6 is a graph showing a portion of a desirable uniform spatially modulated image intensity in a scale grating pattern image generated by the compensated doubly telecentric encoder configurations of FIGS. 4 and 5.

FIG. 6 is a graph 600 showing a desirable uniform spatially modulated image intensity in a scale grating pattern image generated by the compensated doubly telecentric encoder configuration of FIG. 4. Along the horizontal axis, the graph 600 shows positions along the X direction at the photodetector portion 450-1, within the dimension DD. The spatially modulated image intensity SMI-C for the compensated encoder configuration (e.g., the image intensity at each position according to EQUATION 9) is shown along the vertical axis at each position. The periodic structure of the spatially modulated image intensity SMI-C generally images the periodic structure of the scale grating pattern 230. The spatially modulated image intensity SMI-C is relatively undisturbed by destructive interference effects, which are approximately absent as represented in FIG. 6 as a function of the position X by the interference effects envelope IEE-C. For example, relatively high image contrast is indicated by both the peak-to-peak contrast PPC-A' located at approximately X=(DD/9) and the peak-to-peak contrast PPC-B' located at approximately X=0, unlike the results for the uncompensated image channel 280-1 shown in FIG. 3. More generally, the graph 600 indicates good image contrast everywhere over a range between approximately +/−DD/5. It will be appreciated that this particular range on the detector is a result of the particular geometry of corresponding embodiment, and the other embodiments may be configured to cover a larger detector region with an image having good contrast. High levels of peak intensity and good contrast in the image of the scale grating pattern 430 on the photodetector portion 450-1 leads to a high signal to noise ratio in its resulting displacement signals, which allows determining the displacement of the scale grating pattern 430 with the desired degree of accuracy. The compensated encoder configurations of FIGS. 5, 7 and 8 may provide analogous image characteristics.

Figure 7:
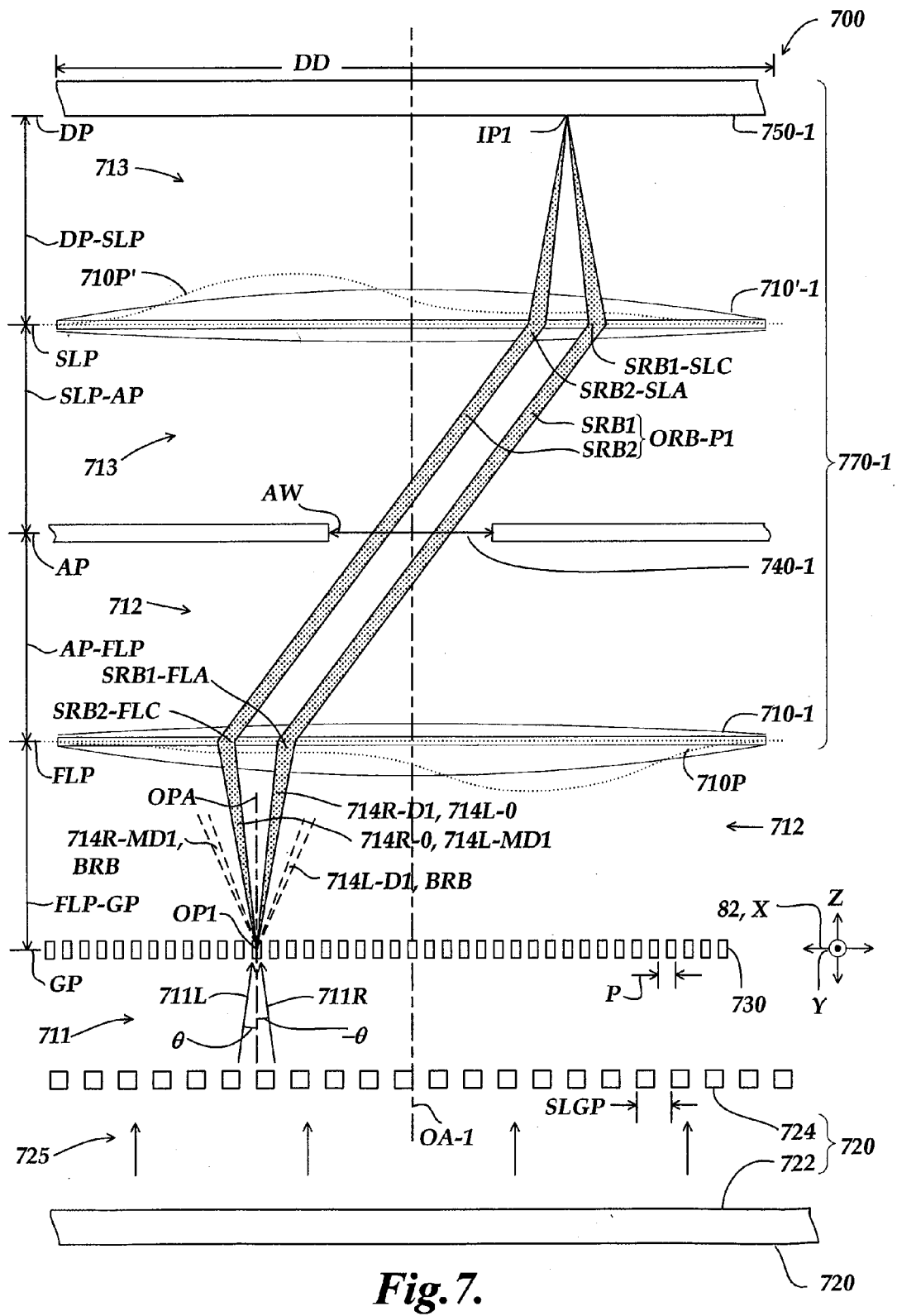
FIG. 7 is a schematic cross-section diagram of a third embodiment of a compensated doubly telecentric encoder configuration in accordance with the present invention.

FIG. 7 is a schematic cross-section diagram of a third embodiment of a compensated doubly telecentric encoder configuration 700, which is configured to reduce or eliminate the previously outlined destructive interference effects. In particular, in one embodiment, the encoder configuration 700 may be configured and operate similarly to the encoder configuration 500 of FIG. 5, except that it is configured such that the source light 711 includes two symmetric components 711L and 711R that are each approximately collimated and directed to the scale grating pattern 730 along respective directions parallel to planes that each have symmetric illumination angles +/−θ relative to a plane that is normal to the measuring axis direction 82 and parallel to the optical axis OA-1, as shown in FIG. 7. In particular, for source light 711 having a nominal wavelength λ and scale grating pattern 730 having a scale grating pitch P, the nominal illumination angle θ may be selected according to EQUATION 14.

For the embodiment shown in FIG. 7, this causes the zero order ray bundle 714L-0 arising from the source light component 711L and the first order diffracted ray bundle 714R-D1 arising from the source light component 711R to be directed at the angle θ. The zero order ray bundle 714R-0 arising from the source light component 711R and the minus first order diffracted ray bundle 714L-MD1 arising from the source light component 711L are directed at the angle −θ. Thus, these four ray bundles combine to form two symmetric ray bundles SRB1 and SRB2, which provide the image-forming characteristics similar to those previously described for symmetric ray bundles SRB1 and SRB2. As shown in FIG. 7, the first order diffracted ray bundle 714L-D1 arising from the source light component 711L is directed approximately along an angle of 3θ, and falls outside the limiting aperture 740-1 as a blocked ray bundle BRB, as may be understood based on description of the analogous ray bundle BRB in FIG. 5. Similarly, the minus first order diffracted ray bundle 714R-MD1 arising from the source light component 711R is directed approximately along an angle of −3θ, and it similarly falls outside the limiting aperture 740-1 as a blocked ray bundle BRB. It will be appreciated that this leaves only the symmetric ray bundles SRB1 and SRB2 to contribute to the image intensity at the image point IP1. Thus, in the embodiment shown in FIG. 7, the symmetric ray bundles SRB1 and SRB2 are also collectively referred to as the operational ray bundles ORB-P1, which image the object point OP1 at the corresponding image point IP1. In this embodiment, the image channel 780-1 is configured such that the symmetric ray bundles SRB1 and SRB2 have approximately equal optical path lengths and the same relative phase, including lens aberration, according to previously described design principles. Thus, the symmetric ray bundles SRB1 and SRB2 have the same optical phase and the same complex amplitudes $A_{SRB1}$ and $A_{SRB2}$ at the image point IP1, and, therefore, constructively interfere to provide significant image contrast in the image of the scale grating pattern 730 at the photodetector portion 750-1. The potential destructive interference effects of the blocked ray bundles BRB (which would have a different optical path length and relative phase than the symmetric ray bundles SRB1 and SRB2) are reduced or eliminated because the blocked ray bundles BRB are approximately or completely blocked at the limiting aperture 740-1. Thus, for this embodiment, the total combined intensity $I_{IP}$ detected at an image point IP on the photodetector detector portion 750-1 is also given by EQUATION 9.

Regarding the limiting aperture 740-1, in some embodiments, it may have an aperture width AW selected according to EQUATIONS 15 and/or 16, and/or as otherwise described above with reference to the aperture width AW of the limiting aperture 540-1.

In the embodiment shown in FIG. 7, in order to provide the symmetric source light components 711L and 711R, the illumination source 720 comprises a primary light source 722 that generates an at least partially coherent, approximately collimated, primary light 725, and a source light grating 724 that inputs the primary light 725 and outputs the symmetric source light components 711L and 711R. In one embodiment, the source light grating 724 is a phase grating that suppresses zero order light using known techniques (e.g., by having an appropriate phase grating thickness profile), and that provides first order diffraction at the desired illumination angle(s) +/−θ. In some embodiments, the primary light source 722 may comprise a diode laser with a wavelength λ in the range of 500-700 nm Scale grating pattern 730 may have a pitch P of 20 μm and the source light grating 724 may have a source light grating 724 pitch SLGP that is approximately 2P, that is, twice the scale grating pattern pitch P.

In a related embodiment, the source light grating may be an amplitude grating that also outputs zero order light and that provides first order diffraction at the desired illumination angle(s) +/−θ. In such an embodiment, the zero order source light may result in central rays and the limiting aperture must therefore, include an aperture blocking element to block those central rays in a manner analogous to the aperture blocking element 440B shown in FIG. 4. In addition, the limiting aperture width AW may need to be narrowed to a degree that blocks unwanted first order diffracted ray bundles arising from the zero order source light at the scale grating pattern.

Figure 8:
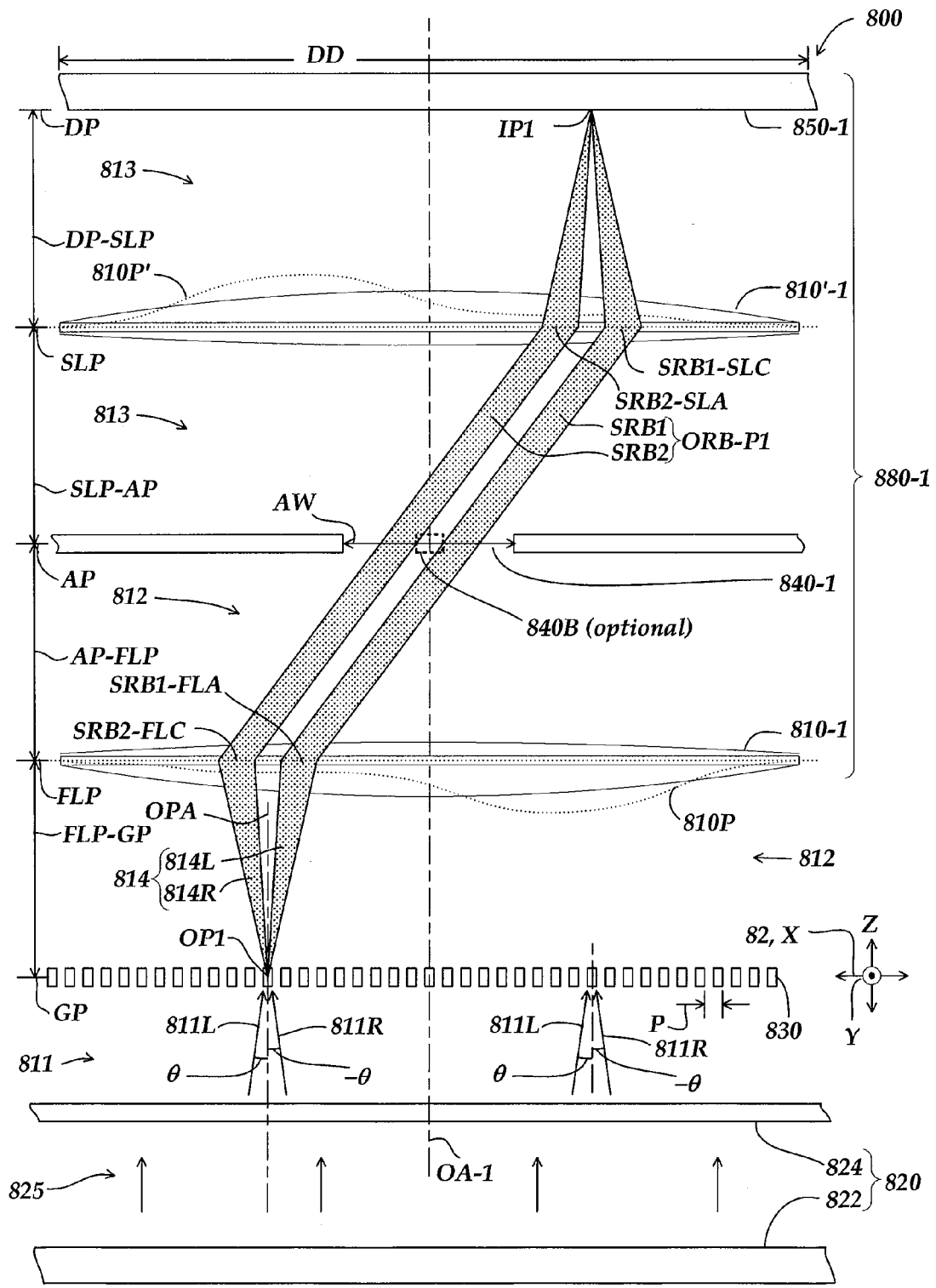
FIG. 8 is a schematic cross-section diagram of a fourth embodiment of a compensated doubly telecentric encoder configuration in accordance with the present invention.

FIG. 8 is a schematic cross-section diagram of a fourth embodiment of a compensated doubly telecentric encoder configuration 800, which is configured to reduce or eliminate the previously outlined destructive interference effects. In particular, in one embodiment, the encoder configuration 800 may be configured and operate similarly to the encoder configuration 700 of FIG. 7, except that it is configured such that the source light 811 includes two symmetric optical ray components 811L and 811R that are directed to the scale grating pattern 830 along nominal directions parallel to planes that each have symmetric illumination angles +/−θ relative to a plane that is normal to the measuring axis direction 82 and parallel to the optical axis OA-1, as shown in FIG. 8. For source light 811 having a nominal wavelength and scale grating pattern 830 having a scale grating pitch P, the nominal illumination angle θ may be selected according to EQUATION 14.

For the embodiment shown in FIG. 8, this causes the ray bundle 814L arising from the source light component 811L and the ray bundle 814R arising from the source light component 811R to be directed at the angles θ and −θ, respectively. Thus, these two ray bundles form two symmetric ray bundles SRB1 and SRB2, which contribute to the image intensity at the image point IP1 and provide the image-forming characteristics similar to those previously described for symmetric ray bundles SRB1 and SRB2. The symmetric ray bundles SRB1 and SRB2 are also collectively referred to as the operational ray bundles ORB-P1, which image the object point OP1 at the corresponding image point IP1. In this embodiment, the image channel 880-1 is configured such that the symmetric ray bundles SRB1 and SRB2 have approximately equal optical path lengths and the same relative phase, including lens aberrations, according to previously described design principles, and thus provide good image contrast.

In the embodiment shown in FIG. 8, in order to provide the symmetric source light components 811L and 811R, the illumination source 820 may comprise a primary light source 822 that generates approximately or roughly collimated, primary light 825, and a beam splitter 824 that inputs the primary light 825 and outputs the symmetric source light components 811L and 811R. In one particular embodiment, the beam splitter 824 may be a Rochon prism. In another particular embodiment, the beam splitter 824 may be a bidirectional diffuser formed according to the teachings of U.S. Pat. Nos. 6,608,722 or 6,798,574, each of which is hereby incorporated herein by reference in its entirety. One commercial source of suitable diffusers is RPC Photonics, Inc., of Rochester, N.Y. In another particular embodiment, the beam splitter 824 may be a lenticular array configured to provide the symmetric source light components 811L and 811R.

In some embodiments, the symmetric source light components 811L and 811R may be partially coherent and/or partially diffuse. In such embodiments, light diffracted at the scale grating pattern 830 may be weak and/or diffuse, such that zero order light transmitted at the scale grating pattern 830 is the primary or only significant contributor to the two symmetric ray bundles SRB1 and SRB2.

Regarding the limiting aperture 840-1, in some embodiments, it may have an aperture width AW selected according to EQUATION 15. In some embodiments, the divergence and/or angular range of the individual symmetric ray bundles 814L and 814R may be larger than is desirable for providing a desired level of image contrast (e.g., such an angular range may be provided by some bidirectional diffusers or lenticular arrays). In such embodiments, the aperture width AW may selected to block an outer portion of the symmetric ray bundles to limit the angular range and optical path length differences in their transmitted portion and provide a desirable image contrast at the photodetector portion 850-1. In some embodiments, an optional aperture blocking element 840B may be included to block an inner portion of the symmetric ray bundles 814L and 814R, for the same purpose. Thus, by these means, ray bundle blocking that includes what might be interpreted as additional ray bundle limiting or shaping may provide suitable symmetric ray bundles, which have similar optical phases at the detector plane according to the principles outlined above.

In another embodiment, the beam splitter 824 may provide a continuous range of illumination angle(s) including the angles +/−θ, and the aperture width AW may be selected to block an outer portion of the ray bundle(s) included continuous range, and an aperture blocking element 840B (non-optional in this particular case) is included to block the central portion of the ray bundle(s) included continuous range, in order to limit the angular range and optical path length differences in the resulting transmitted ray bundles. The transmitted ray bundles may thus resemble the symmetric ray bundles included in the operational ray bundles ORB-P1 shown in FIG. 8, and may operate similarly.

It will be appreciated that in the foregoing illustrations, the scale along various axes may have been exaggerated for clarity. Furthermore, although cylindrical lenses are shown in FIG. 1 for clarity, in some embodiments circular lenses, or a 2D array of circular lenses may be used. Similarly, the rectangular or oblong limiting apertures shown in FIG. 1 may be advantageous for maximizing signal strength in various embodiments, however, shorter apertures may be used in other embodiments. Furthermore, it will be appreciated that certain portions of the transmissive embodiments outlined above may be replaced by reflective component arrangements that support operation according to the inventive features and teachings outlined above and claimed below.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for providing a relatively uniform scale image at a detector of a doubly telecentric optical encoder arrangement, the method comprising:

providing a telecentric imaging configuration including:
a first portion comprising a first lens located at a first lens plane along an optical axis, a limiting aperture located at an aperture plane along the optical axis, a second lens located at a second lens plane along the optical axis, and a photodetector configuration located at a detector plane along the optical axis,
a scale grating pattern located at a grating plane along the optical axis, the scale grating pattern extending along a measuring axis direction and having a grating pitch P; and
an illumination source configured to illuminate the scale grating pattern with a first source light comprising light that is directed parallel to a first plane having a first nominal illumination angle θ relative to a plane that is normal to the measuring axis direction and parallel to the optical axis, the first source light having a wavelength L;

operating the illumination source to illuminate the scale grating using the first source light directed parallel to the first plane having the first nominal illumination angle θ;

diffracting the first source light from the scale grating as first diffracted scale light that includes $+1^{st}$ order light, $-1^{st}$ order light, and zero order light arising from the first source light;

transmitting the first diffracted scale light through the first lens and toward the aperture plane;

spatially filtering the transmitted first diffracted scale light using the limiting aperture and transmitting that spatially filtered light as first image light;

transmitting the first image light through the second lens and forming an image of the scale grating pattern on the photodetector configuration; and providing a displacement signal that is responsive to the position of the image of the scale grating pattern relative to the photodetector configuration along the measuring axis direction;

wherein:

the telecentric imaging configuration is configured such that an object point on the scale grating is imaged to a corresponding image point in the image on the photodetector configuration by light included in the first diffracted scale light arising at that object point, the first diffracted scale light arising at that object point comprising a $+1^{st}$ order light ray bundle, a $-1^{st}$ order light ray bundle, and a zero order light ray bundle;

the step of spatially filtering the transmitted first diffracted light using the limiting aperture and transmitting that spatially filtered light as first image light comprises:

blocking at least a majority of one of the $+1^{st}$ order light ray bundle, the $-1^{st}$ order light ray bundle, and the zero order light ray bundle at the aperture plane, and transmitting at least a majority of the other two of the $+1^{st}$ order light ray bundle, the $-1^{st}$ order light ray bundle, and the zero order light ray bundle through the limiting aperture to define a pair of imaging ray bundles that contribute to the first image light that reaches the corresponding image point; and the telecentric imaging configuration is configured such that a first member of the pair of imaging ray bundles passes through a first portion of the first lens and a second portion of the second lens, a second member of the pair of imaging ray bundles passes through a second portion of the first lens and a first portion of the of the second lens, and the first portions of the first and second lenses have nominally the same first optical path length and the second portions of the first and second lenses have nominally the same second optical path length.

2. The method of claim 1, wherein the first and second members of the pair of imaging ray bundles are nominally symmetrically inclined at the object point, relative to a plane through the object point that is normal to the measuring axis direction and parallel to the optical axis.

3. The method of claim 2, wherein the first and second lenses have nominally the same form and are arranged with minor symmetry about a plane parallel to the aperture plane.

4. The method of claim 3, wherein the first and second lenses are arranged with rotational symmetry relative to an axis perpendicular to the measuring axis direction that nominally coincides with an intersection of the optical axis and the aperture plane.

5. The method of claim 4, wherein the first and second lenses are formed by a fabrication process including molding, and the first and second lenses are molded in the same mold.

6. The method of claim 1, wherein the first nominal illumination angle θ is zero and the step of blocking one of the $+1^{st}$ order light ray bundle, the $-1^{st}$ order light ray bundle, and the zero order light ray bundle at the aperture plane comprises blocking at least a majority of the zero order light ray bundle by locating a blocking element along the optical axis within the limiting aperture.

7. The method of claim 6, wherein the grating plane and the first lens plane are spaced apart by a distance (FLP-GP) and the limiting aperture has a width AW along the measuring axis direction selected such that:

$$5*(FLP\text{-}GP)*\tan(\arcsin [L/P]) \geq AW \geq 2.5*(FLP\text{-}GP)*\tan(\arcsin [L/P]).$$

8. The method of claim 1, wherein the first nominal illumination angle θ is $$\theta = \frac{1}{2}\arcsin(L/P)$$

and the step or blocking at least a majority of one of the $+1^{st}$ order light ray bundle, the $-1^{st}$ order light ray bundle, and the zero order light ray bundle at the aperture plane comprises blocking at least a majority of one of the $+1^{st}$ order light ray bundle and the $-1^{st}$ order light ray bundle.

9. The method of claim 8, wherein blocking at least a majority of one of the $+1^{st}$ order light ray bundle and the $-1^{st}$ order light ray bundle comprises limiting the width of the limiting aperture along the measuring axis direction such that at least a majority of the one of the +1$^{st}$ order light ray bundle and the −1$^{st}$ order light ray bundle that is blocked falls outside of the limiting aperture.

10. The method of claim 9, wherein the grating plane and the first lens plane are spaced apart by a distance (FLP-GP) and the limiting aperture has a width AW along the measuring axis direction selected such that:

1.5*(FLP-GP)*tan [3θ]≧AW≧2.5*(FLP-GP)*tan θ.

11. The method of claim 1, wherein:
the first nominal illumination angle θ is $$\theta = \frac{1}{2}\arcsin(L/P);$$

the illumination source is configured to illuminate the scale grating pattern with both the first source light and a second source light, the first source light comprising light that is directed parallel to the first plane having the first nominal illumination angle θ and the second source light comprising light that is directed parallel to a second plane having a second nominal illumination angle −θ, the second source light having the wavelength L; and
the method further comprises:
 operating the illumination source to illuminate the scale using the second source light directed parallel to the second plane having the second nominal illumination angle −θ; and
 diffracting the second source light from the scale grating such that the first diffracted scale light further includes +1$^{st}$ order light, −1$^{st}$ order light, and zero order light arising from the second source light;
wherein:
 the telecentric imaging configuration is configured such that an object point on the scale grating is imaged to a corresponding image point in the image on the photodetector configuration by light included in the first diffracted scale light arising at that object point, the first diffracted scale light arising at that object point comprising a +1$^{st}$ order light ray bundle, a −1$^{st}$ order light ray bundle, and a zero order light ray bundle arising from the first source light and a +1$^{st}$ order light ray bundle, a −1$^{st}$ order light ray bundle, and a zero order light ray bundle arising from the second source light;
 the step of spatially filtering the transmitted first diffracted light using the limiting aperture and transmitting that spatially filtered light as first image light comprises:
  blocking at least a majority of one of the +1$^{st}$ order light ray bundle and the −1$^{st}$ order light ray bundle arising from the first source light at the aperture plane;
  transmitting at least a majority of the zero order light ray bundle and the other of the +1$^{st}$ order light ray bundle and the −1$^{st}$ order light ray bundle arising from the first source light through the limiting aperture to define first components of the pair of imaging ray bundles that contribute to the first image light that reaches the corresponding image point;
  blocking at least a majority of the other of the +1$^{st}$ order light ray bundle and the −1$^{st}$ order light ray bundle arising from the second source light at the aperture plane; and
  transmitting at least a majority of the zero order light ray bundle and the other of the +1$^{st}$ order light ray bundle and the −1$^{st}$ order light ray bundle arising from the second source light through the limiting aperture to define second components of the pair of imaging ray bundles that contribute to the first image light that reaches the corresponding image point; and
 the telecentric imaging configuration is configured such that a first member of the pair of imaging ray bundles includes one of the first components and one of the second components and passes through a first portion of the first lens and a second portion of the second lens, a second member of the pair of imaging ray bundles includes the other of the first components and the other of the second components and passes through a second portion of the first lens and a first portion of the second lens, and the first portions of the first and second lenses have nominally the same first optical path length and the second portions of the first and second lenses have nominally the same second optical path length.

12. The method of claim 11, wherein the first source light and the second source light are partially coherent and the illumination source comprises a beamsplitter that outputs the first source light and the second source light.

13. The method of claim 12, further comprising locating a blocking element along the optical axis within the limiting aperture such that the first and second members of the pair of imaging ray bundles are separated at the aperture plane by at least the width of the blocking element along the measuring axis direction.

14. The method of claim 11, wherein the first source light and the second source light are coherent, and the illumination source comprises a phase grating that outputs the first source light and the second source light.

15. A doubly telecentric imaging configuration for use in an optical encoder that senses displacements, the doubly telecentric imaging configuration including:
 a first portion comprising a first lens located at a first lens plane along an optical axis, a limiting aperture located at an aperture plane along the optical axis, a second lens located at a second lens plane along the optical axis, and a photodetector configuration located at a detector plane along the optical axis;
 a scale grating pattern located at a grating plane along the optical axis, the scale grating pattern extending along a measuring axis direction and having a grating pitch P; and
 an illumination source configured to illuminate the scale grating pattern with a first source light comprising light that is directed parallel to a first plane having a first nominal illumination angle θ relative to a plane that is normal to the measuring axis direction and parallel to the optical axis, the first source light having a wavelength L,
wherein the doubly telecentric imaging configuration is configured such that:
 an object point on the scale grating is imaged to a corresponding image point in the image on the photodetector configuration by light included in a first diffracted scale light arising at that object point, the first diffracted scale light arising at that object point comprising a +1$^{st}$ order light ray bundle, a −1$^{st}$ order light ray bundle, and a zero order light ray bundle arising from the first source light;
 the first diffracted scale light is transmitted through the first lens and toward the aperture plane;
 the limiting aperture spatially filters the transmitted first diffracted scale light and transmits that spatially filtered light to be included in a first image light, wherein the limiting aperture is configured to:

block at least a majority of one of the +1$^{st}$ order light ray bundle, the −1$^{st}$ order light ray bundle, and the zero order light ray bundle at the aperture plane, and transmit at least a majority of the other two of the +1$^{st}$ order light ray bundle, the −1$^{st}$ order light ray bundle, and the zero order light ray bundle through the limiting aperture to define a pair of imaging ray bundles that contribute to the first image light that reaches the corresponding image point;

the first image light is transmitted through the second lens to form an image of the scale grating pattern on the photodetector configuration;

the photodetector configuration provides a displacement signal that is responsive to the position of the image of the scale grating pattern relative to the photodetector configuration along the measuring axis direction; and a first member of the pair of imaging ray bundles passes through a first portion of the first lens and a second portion of the second lens, a second member of the pair of imaging ray bundles passes through a second portion of the first lens and a first portion of the of the second lens, and the first portions of the first and second lenses have nominally the same first optical path length and the second portions of the first and second lenses have nominally the same second optical path length.

16. The doubly telecentric imaging configuration of claim 15, wherein the first and second members of the pair of imaging ray bundles are nominally symmetrically inclined at the object point, relative to a plane through the object point that is normal to the measuring axis direction and parallel to the optical axis.

17. The doubly telecentric imaging configuration of claim 16, wherein the first and second lenses have nominally the same form and are arranged with minor symmetry about a plane parallel to the aperture plane.

18. The doubly telecentric imaging configuration of claim 17, wherein the first and second lenses are arranged with rotational symmetry relative to an axis perpendicular to the measuring axis direction that nominally coincides with an intersection of the optical axis and the aperture plane.

19. The doubly telecentric imaging configuration of claim 18, wherein the first and second lenses are formed by a fabrication process including molding, and the first and second lenses are molded in the same mold.

20. The doubly telecentric imaging configuration of claim 15, wherein the first nominal illumination angle θ is zero and the limiting aperture is configured to block at least a majority of the zero order light ray bundle by including a blocking element located along the optical axis within the limiting aperture.

21. The doubly telecentric imaging configuration of claim 20, wherein the grating plane and the first lens plane are spaced apart by a distance (FLP-GP) and the limiting aperture has a width AW along the measuring axis direction selected such that:

5*(FLP-GP)*tan(arcsin [L/P])≧AW≧2.5*(FLP-GP)*tan(arcsin [L/P]).

22. The doubly telecentric imaging configuration of claim 15, wherein the first nominal illumination angle θ is $$\theta = \frac{1}{2}\arcsin(L/P)$$

and the limiting aperture is configured to block at least a majority of one of the +1$^{st}$ order light ray bundle and the −1$^{st}$ order light ray bundle.

23. The doubly telecentric imaging configuration of claim 22, wherein the limiting aperture is configured such that the at least a majority of the one of the +1$^{st}$ order light ray bundle and the −1$^{st}$ order light ray bundle that is blocked falls outside of the limiting aperture.

24. The doubly telecentric imaging configuration of claim 23, wherein the grating plane and the first lens plane are spaced apart by a distance (FLP-GP) and the limiting aperture has a width AW along the measuring axis direction selected such that:

1.5*(FLP-GP)*tan [3θ]≧AW≧2.5*(FLP-GP)*tan θ.

25. The doubly telecentric imaging configuration of claim 15, wherein the doubly telecentric imaging configuration is furthermore configured such that:

the first nominal illumination angle θ is $$\theta = \frac{1}{2}\arcsin(L/P);$$

the illumination source is configured to illuminate the scale grating pattern with both the first source light and a second source light, the first source light comprising light that is directed parallel to the first plane having the first nominal illumination angle θ and the second source light comprising light that is directed parallel to a second plane having a second nominal illumination angle −θ, the second source light having the wavelength L;

the second source light is diffracted from the scale grating such that the first diffracted scale light further includes +1$^{st}$ order light, −1$^{st}$ order light, and zero order light arising from the second source light;

an object point on the scale grating is imaged to a corresponding image point in the image on the photodetector configuration by light included in the first diffracted scale light arising at that object point, the first diffracted scale light arising at that object point comprising a +1$^{st}$ order light ray bundle, a −1$^{st}$ order light ray bundle, and a zero order light ray bundle arising from the first source light and a +1$^{st}$ order light ray bundle, a −1$^{st}$ order light ray bundle, and a zero order light ray bundle arising from the second source light;

the first diffracted scale light including ray bundles arising from the first and second source lights is transmitted through the first lens and toward the aperture plane;

the limiting aperture spatially filters the transmitted first diffracted scale light and transmits that spatially filtered light to be included in a first image light, wherein the limiting aperture is configured to:

block at least a majority of one of the +1$^{st}$ order light ray bundle and the −1$^{st}$ order light ray bundle arising from the first source light at the aperture plane;

transmit at least a majority of the zero order light ray bundle and the other of the +1$^{st}$ order light ray bundle and the −1$^{st}$ order light ray bundle arising from the first source light through the limiting aperture to define first components of the pair of imaging ray bundles that contribute to the first image light that reaches the corresponding image point;

block at least a majority of the other of the $+1^{st}$ order light ray bundle and the $-1^{st}$ order light ray bundle arising from the second source light at the aperture plane; and transmit at least a majority of the zero order light ray bundle and the other of the $+1^{st}$ order light ray bundle and the $-1^{st}$ order light ray bundle arising from the second source light through the limiting aperture to define second components of the pair of imaging ray bundles that contribute to the first image light that reaches the corresponding image point; and a first member of the pair of imaging ray bundles includes one of the first components and one of the second components and passes through a first portion of the first lens and a second portion of the second lens, a second member of the pair of imaging ray bundles includes the other of the first components and the other of the second components and passes through a second portion of the first lens and a first portion of the of the second lens, and the first portions of the first and second lenses have nominally the same first optical path length and the second portions of the first and second lenses have nominally the same second optical path length.

26. The doubly telecentric imaging configuration of claim 25, wherein the first source light and the second source light are partially coherent and the illumination source comprises a beamsplitter configured to output the first source light and the second source light.

27. The doubly telecentric imaging configuration of claim 26, further comprising a blocking element located along the optical axis within the limiting aperture such that the first and second members of the pair of imaging ray bundles are separated at the aperture plane by at least the width of the blocking element along the measuring axis direction.

28. The doubly telecentric imaging configuration of claim 25, wherein the first source light and the second source light are coherent, and the illumination source comprises a phase grating configured to output the first source light and the second source light.

* * * * *

UNITED STATES PATENT AND TRADEMARK OFFICE
CERTIFICATE OF CORRECTION

PATENT NO. : 8,492,703 B2  
APPLICATION NO. : 12/535561  
DATED : July 23, 2013  
INVENTOR(S) : J. D. Tobiason et al.

Page 1 of 1

It is certified that error appears in the above-identified patent and that said Letters Patent is hereby corrected as shown below:

In the Claims

COLUMN   LINE

16   50-51   each occurrence of "$\geqq$" should read -- $\geq$ --
(Claim 7, lines 5-6)

17   8   each occurrence of "$\geqq$" should read -- $\geq$ --
(Claim 10, line 5)

19   25   delete the second occurrence of "of the"
(Claim 15, line 57)

19   63-64   each occurrence of "$\geqq$" should read -- $\geq$ --
(Claim 21, lines 7-8)

20   20   each occurrence of "$\geqq$" should read -- $\geq$ --
(Claim 24, line 7)

Signed and Sealed this  
Fifteenth Day of July, 2014

Michelle K. Lee  
*Deputy Director of the United States Patent and Trademark Office*